3,400,251
ELECTRIC CONTROL CIRCUITS
Peter Augustine Coyle, Ilford, Albert George Michael Reeves, Wanstead, London, and David Charles Sanders, Romford, England, assignors to The Plessey Company Limited, Ilford, England, a British company
Filed July 27, 1965, Ser. No. 475,144
Claims priority, application Great Britain, July 27, 1964, 17,317/64
7 Claims. (Cl. 219—503)

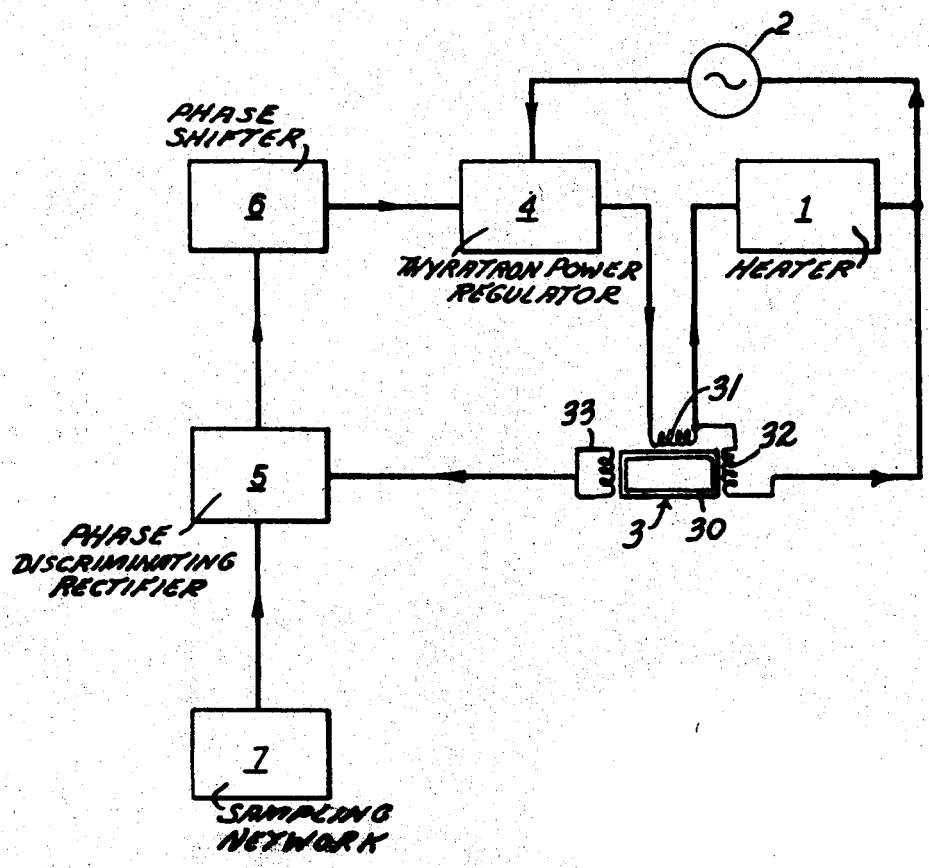

ABSTRACT OF THE DISCLOSURE

In a control system for an A.-C. energized electrical resistance heater, the D.C. output of a phase-discriminating rectifier to which an A.-C. voltage differentially indicative of the heater current and the voltage across the heater is fed, are applied through a phase-shift network to a thyratron-type power regulator, the rectifier being arranged to pass current only in a part-period of each half cycle in which heating current is allowed to flow irrespective of the heater temperature.

---

This invention relates to an electric control circuit for controlling the temperature of an electrical resistance heater.

Hitherto heating elements have been provided with electric control circuits for maintaining constant the temperature of a heater element which is to be energised by alternating current. Such an electric control circuit may, for example take the form of a control winding magnetically coupled via a common magnetic circuit to a first coil connected in series with the heater element and to a second coil connected in parallel with the heater element, wherein the first and second coils are connected so as to be of the opposite magnetic sense the arrangement being such that no magnetic flux is produced in the common magnetic circuit to link with the control winding when the temperature of the heater element is at a predetermined value.

In such a system, power is applied to the heater element by means of an on-off control system. For greater accuracy of temperature control of the heater it is desirable that a continuously variable power supply should be provided.

According to one aspect of the present invention, in a control system of the type disclosed above, signals from a phase discriminating rectifier are applied through a phase shift network to a power regulator whereby a continuously variable power supply is obtained which is responsive to an error signal derived from measurement of the heater resistance.

Preferably error signals are obtained continuously during operation of the control system.

According to a further aspect of the invention, the use of a sampling network with the phase discriminating rectifier permits sampling of the heater resistance to be done at a predetermined point in the alternating voltage power cycle. Conditions are arranged so that at this point the voltage applied to the heater is substantially constant irrespective of the immediate state of regulation of the power supply to the heater. Thus, if the maximum firing angle of the power regulator is limited to 120°, measurement of the heater resistance can take place in the last 45° of each half cycle of the power supply.

The invention will be further explained with reference to the accompanying drawing which illustrates, as an example, a single embodiment of the invention in the form of a block schematic diagram.

In this embodiment, an electrical resistance heater 1 is energised by connection to a supply 2 of alternating current. An error detector 3 includes a magnetic core 30 mutually coupling the sensing coils 31 and 32, and a control coil 33, one sensing coil 31 being connected in series with the resistance heater 1, while the second sensing coil 32 lies in parallel to the heater. The control coil 33 therefore provides an A.C. output corresponding to any change in heater resistance. Additionally a power regulator 4 is connected in series with the resistance heater 1. The power regulator 4 is a phase shift type of regulator including thyristors.

Signals from the error detector 3 are fed to a phase discriminating rectifier 5. The output from the phase discriminating rectifier 5 controls a phase shift network 6 which in turn controls the power regulator 4. The phase shift network 6 may be any form of network which will give a train of pulses suitable for firing the particular regulator in use and in which the phase angle of the pulse relative to the supply voltage can be varied by means of a D.C. signal.

The phase discriminating rectifier 5 is also responsive to signals from a sampling network 7. The latter comprises a thyristor phase-shift regulator controlled by a suitable firing circuit that can be preset to give a constant phase shift. The function of the sampling network 7 will be more fully described hereinbelow.

This control system operates in the following manner. A nominal power will keep the heater 1 at the control temperature under normal conditions. Any change in the heater dissipation due to a change in ambient temperature conditions will result in a change of heater temperature and resistance. The resistance of the heater is measured by the error detector 3 which in conjunction with the phase discriminating rectifier 5 gives a D.C. output signal corresponding in polarity and proportional in magnitude to the change in heater resistance. This D.C. signal when fed to the phase shift network 6, will vary the phase of the firing pulses and the firing angle of the power regulator 4, and hence the power supplied to the heater 1.

The circuit is adjusted so that at the control temperature the output from the error detector 3 is zero. With zero input, the phase shift network 6 will fire the power regulator 4 such that nominal power is supplied to the heater. If the ambient temperature conditions change then the system will adjust the power accordingly to maintain the heater at a constant temperature. Thus if the ambient temperature decreases, the heater temperature and resistance will decrease. The error detection circuit will give an output proportional to the change of heater resistance which will reduce the firing angle of the power regulator and increase the power delivered to the heater sufficiently to raise its temperature to the control level. As the temperature rises to the control level, the error signal is reduced and the firing angle increased until, when the heater is at the control temperature, a steady state is reached.

The resistance of the heater, which is the ratio of the voltage drop across the heater to the current flowing through the heater, is measured in terms of difference in the mean values of voltage and current. The accuracy of control obtained in this manner is however liable to be adversely affected by the fact that the power regulator produces current having clipped waveforms. The error signal obtained from the error detector is, in fact, at each instant proportional both to the temperature error existing and the voltage applied to the heater.

These two variables which produce an error signal could cause a problem to arise since if a large error was obtained from an uncompensated system, it would be difficult to determine whether the error was due to the fact that the heater was very cold or because full voltage was being applied. When the heater is at the control temperature no error would be obtained and the heater voltage would be the nominal value. If the heater is then cooled, an error signal would appear and cause the heater voltage to increase. This in turn would increase the error signal and thus cause a further increase in heater voltage. The system would therefore run away to full power and then, having reached the control temperature, the system would be driven to minimum power and thus an unsteady state would result.

To overcome this difficulty, a sampling network 7 is arranged to control the phase-discriminating rectifier 5 so that the latter only produces in each half-cycle an output during a portion of that half-cycle in which a voltage is applied to the heater independentally of the firing angle of the power regulator 4. This is done by limiting, by means of the sampling network 7, the D.C. output from the rectifier 5 to the last 45 degrees of each half cycle of the supply and by limiting the maximum firing angle of the power regulator 4 to 120°, this corresponding to a minimum heating power. Thus during the last 45° of each half cycle the heater voltage is below that corresponding to 120° firing angle and is therefore not dependent on changes in the firing angle in response to a D.C. output signal from the phase-discriminating rectifier 5. The error signal is consequently dependent only upon the resistance of the heater.

The foregoing description of an embodiment of the invention has been given merely as an example and a number of modifications can be made without departing from the scope of the invention. For instance where the use of thyristors has been described these devices could be replaced by other means that would perform the same function such as silicon controlled rectifiers, for example thyratrons or saturable reactors.

What we claim is:

1. An electric control circuit for controlling the temperature of a heater element energised in a heating circuit fed from an alternating-current supply, the control circuit comprising first and second coil means connected to the heating circuit respectively in series and in parallel with said heater element, magnetic coupling means by which said first and second coil means are inductively coupled in mutual phase opposition, control-coil means inductively coupled differentially with said first and second coil means by said magnetic coupling means, phase-discriminating rectifier means responsive to the induced voltage of said control coil to produce a D.-C. output indicative in polarity and magnitude of the sign and magnitude of the temperature error of the heater element, and power-regulator means responsive to said D.-C. output to control the power supplied to the heater element by the heating circuit.

2. A circuit as claimed in claim 1, wherein the power-regulating means are of a type affecting the heater voltage during a part only of at least one half-cycle in each cycle of the A.C. supply, the circuit including sampling means rendering the phase-discriminating rectifier means operative during that part only of at least one half cycle in each cycle of the A.C. supply in which the voltage applied to the heater is substantially independent of the power supplied to the heater in said half cycle.

3. A system as claimed in claim 2, wherein said power-regulating means comprise means limiting the application of the power supply to the heater in at least one half-cycle of each cycle to a continuous variable-length portion of said half cycle.

4. A circuit as claimed in claim 2, wherein said power-regulator means include phase-shifting means responsive to the D.C. output of the phase-discriminating rectifier means to vary the phase of a train of pulses relative to the alternating-current supply, and means responsive to said relative phase of said train of pulses to vary the power supplied to the heater element.

5. A system as claimed in claim 2 in which the maximum pass angle of the power regulator means is limited to 120°.

6. A system as claimed in claim 5 in which the sampling is effected in the last 45° of each half cycle of the power supply voltage.

7. An electric control circuit for controlling the temperature of a heater element, said control circuit comprising first and second coil means associated with the heater element, third coil means inductively coupled with said first and second coil means, a control unit responsive to voltages induced into said third coil means to regulate the alternating current flow through said heater element, characterised in that said control unit comprises phase discriminating rectifier means responsive to the induced voltages in said third winding, phase shifting means responsive to a direct current output of said rectifier means and power regulator means operative in dependence upon the phase of a train of pulses, relative to an alternating current supply, to control the power supplied to said heater element.

References Cited

UNITED STATES PATENTS

| 3,040,157 | 6/1962 | Hukee | 219—501 X |
| 3,259,825 | 7/1966 | James | 219—501 X |
| 3,299,345 | 1/1967 | Werts | 219—501 X |
| 3,299,346 | 1/1967 | Gambill | 219—501 X |
| 3,305,766 | 2/1967 | Gambill | 219—501 X |
| 3,176,212 | 3/1965 | DePuy | 323—22 |
| 3,226,627 | 12/1965 | Fromkin | 321—18 |
| 3,337,792 | 8/1967 | Engelson | 219—501 |
| 3,341,769 | 9/1967 | Grant | 219—501 |

FOREIGN PATENTS 892,825   3/1962   Great Britain.

RICHARD M. WOOD, *Primary Examiner.*

L. H. BENDER, *Assistant Examiner.*